US012760898B2

(12) United States Patent
Ozaki et al.

(10) Patent No.: US 12,760,898 B2
(45) Date of Patent: Oct. 13, 2026

(54) COMBUSTOR OF GAS TURBINE

(71) Applicant: KAWASAKI JUKOGYO KABUSHIKI KAISHA, Kobe (JP)

(72) Inventors: Yoshihiko Ozaki, Kobe (JP); Ryusuke Matsuyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/873,812

(22) PCT Filed: Aug. 9, 2023

(86) PCT No.: PCT/JP2023/029157
§ 371 (c)(1),
(2) Date: Dec. 11, 2024

(87) PCT Pub. No.: WO2023/243734
PCT Pub. Date: Dec. 21, 2023

(65) Prior Publication Data

US 2025/0362021 A1 Nov. 27, 2025

(30) Foreign Application Priority Data

Jun. 16, 2022 (JP) ................................ 2022-096971

(51) Int. Cl.
*F23R 3/60* (2006.01)
*F23R 3/00* (2006.01)
*F23R 3/50* (2006.01)

(52) U.S. Cl.
CPC ................ *F23R 3/60* (2013.01); *F23R 3/007* (2013.01); *F05D 2260/38* (2013.01);
(Continued)

(58) Field of Classification Search
CPC .. F23R 3/60; F23R 3/007; F23R 3/002; F23R 3/50; F23R 2900/00017; F05D 2260/38
See application file for complete search history.

(56) References Cited

U.S. PATENT DOCUMENTS 4,944,151 A 7/1990 Hovnanian
5,201,799 A * 4/1993 Johnson ................. F16B 21/18 24/563

(Continued)

FOREIGN PATENT DOCUMENTS

EP 1507117 A1 2/2005
GB 701099 A 12/1953

(Continued)

*Primary Examiner* — Phutthiwat Wongwian
*Assistant Examiner* — Rene D Ford
(74) *Attorney, Agent, or Firm* — Sughrue Mion, PLLC

(57) ABSTRACT

A combustor of a gas turbine includes: a shell surrounding a combustion chamber; a liner located inside the shell and facing the combustion chamber; and a fixture by which the liner is attached to the shell. The fixture includes: a support including a shaft portion and a head portion, the shaft portion penetrating the shell, the head portion being connected to the shaft portion and supporting the liner from an inside of the shell in a radial direction; a fixing structure attached to the shaft portion of the support at an outside of the shell in the radial direction; a spacer interposed between the shell and the liner; and a biasing structure that biases the liner toward the inside in the radial direction to separate the liner from the shell in the radial direction and form a gap between the spacer and the shell in the radial direction.

1 Claim, 6 Drawing Sheets

(52) U.S. Cl.
CPC ................. *F23R 3/002* (2013.01); *F23R 3/50* (2013.01); *F23R 2900/00017* (2013.01)

(56) References Cited

U.S. PATENT DOCUMENTS

| | | | | |
|---|---|---|---|---|
| 6,085,515 | A | 7/2000 | Walz et al. | |
| 6,145,452 | A | 11/2000 | Heger et al. | |
| 2002/0050237 | A1 | 5/2002 | Becker | |
| 2003/0021675 | A1 | 1/2003 | Tiemann | |
| 2004/0250549 | A1* | 12/2004 | Liebe | F23R 3/50<br>60/804 |
| 2011/0314829 | A1 | 12/2011 | Kuppusamy | |
| 2016/0356223 | A1 | 12/2016 | Huang et al. | |
| 2016/0377296 | A1 | 12/2016 | Bangerter et al. | |
| 2020/0003417 | A1 | 1/2020 | Schlichting | |

FOREIGN PATENT DOCUMENTS

| | | | |
|---|---|---|---|
| JP | 3-38559 | U | 4/1991 |
| JP | 2002-506963 | A | 3/2002 |
| JP | 2005-509827 | A | 4/2005 |
| JP | 2017-2900 | A | 1/2017 |

* cited by examiner

COMBUSTOR OF GAS TURBINE

CROSS REFERENCE TO RELATED APPLICATIONS

This application is a National Stage of International Application No. PCT/JP2023/029157 filed Aug. 9, 2023, claiming priority based on Japanese Patent Application No. 2022-096971 filed Jun. 16, 2022, the entire contents of which are incorporated in their entirety.

DESCRIPTION

Technical Field

The present disclosure relates to a combustor of a gas turbine.

Background Art

In recent years, a combustion temperature in a gas turbine is increasing for the purpose of improving fuel efficiency. Proposed as a combustor of the gas turbine is a combustor in which a liner is located inside a shell surrounding a combustion chamber and is fastened to the shell with a bolt (see PTL 1, for example).

CITATION LIST

Patent Literature

PTL 1: US 2020/0003417 A1

SUMMARY OF INVENTION

Technical Problem

While the gas turbine is operating, a thermal expansion difference is generated between the shell and the liner by a temperature difference between the shell and the liner, a difference between thermal expansion coefficients of materials, a temperature difference between front and rear surfaces of the liner, and the like. Therefore, binding power is generated at the liner through the bolt, and this may reduce the life of the liner.

An object of one aspect of the present disclosure is to improve durability of a liner in a combustor of a gas turbine.

Solution to Problem

A combustor of a gas turbine according to one aspect of the present disclosure includes: a shell surrounding a combustion chamber; a liner located inside the shell and facing the combustion chamber; and a fixture by which the liner is attached to the shell. The fixture includes: a support including a shaft portion and a head portion, the shaft portion penetrating the shell, the head portion being connected to the shaft portion and supporting the liner from an inside of the shell in a radial direction; a fixing structure attached to the shaft portion of the support at an outside of the shell in the radial direction; a spacer interposed between the shell and the liner; and a biasing structure that biases the liner toward the inside in the radial direction to separate the liner from the shell in the radial direction and form a gap between the spacer and the shell in the radial direction.

A combustor of a gas turbine according to another aspect of the present disclosure includes: a shell surrounding a combustion chamber; a liner located inside the shell and facing the combustion chamber; a cooling space into which compressed air flows and which is located between the shell and the liner; and a fixture by which the liner is attached to the shell. The fixture includes: a support including a shaft portion and a head portion, the shaft portion penetrating the shell, the head portion being connected to the shaft portion and supporting the liner from an inside of the shell in a radial direction; a spacer interposed between the shell and the liner; a fixing structure attached to the shaft portion of the support at an outside of the shell in the radial direction; and a biasing structure that is located outside the shell in the radial direction and located inside the fixing structure in the radial direction and biases the fixing structure toward the outside in the radial direction such that the liner approaches the shell in the radial direction against the compressed air flowing into the cooling space.

A combustor of a gas turbine according to yet another aspect of the present disclosure includes: a shell surrounding a combustion chamber; liner panels located inside the shell and facing the combustion chamber; and fixtures which attach the liner panels to the shell. The liner panels are located in a circumferential direction of the shell, and three of the fixtures support one of the liner panels by three-point support.

Advantageous Effects of Invention

According to one aspect of the present disclosure, the durability of the liner in the combustor of the gas turbine can be improved.

DESCRIPTION OF EMBODIMENTS

Embodiment 1

Hereinafter, embodiments will be described with reference to the drawings. An axis X of a gas turbine 1 is the same as an axis of a combustor 3. A direction orthogonal to the axis X of the combustor 3 is referred to as a radial direction R of the combustor 3. A direction extending around the axis X is referred to as a circumferential direction C of the combustor 3. Regarding a flow direction F of compressed air in a combustion chamber 16, a side toward fuel injectors 17 is referred to as an upstream side, and a side toward a discharge port **16*a*** is referred to as a downstream side.

Figure 1:
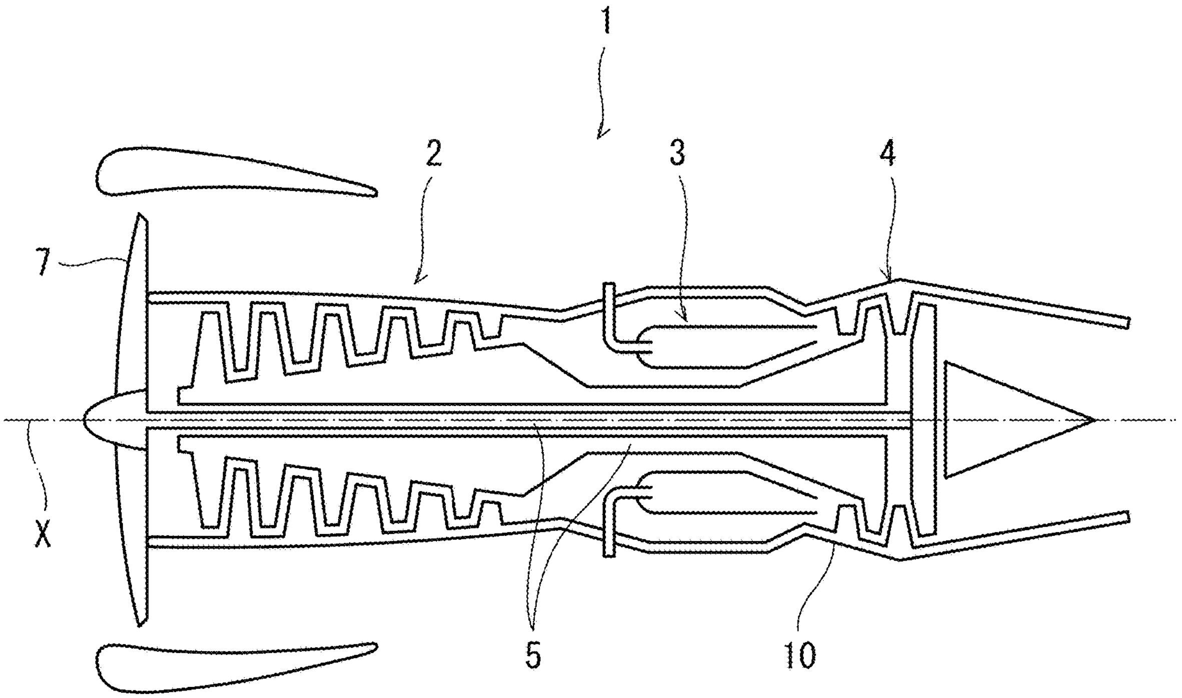
FIG. 1 is a schematic sectional view of a gas turbine according to Embodiment 1.

FIG. 1 is a schematic sectional view of the gas turbine 1 of Embodiment 1. As shown in FIG. 1, the gas turbine 1 includes a compressor 2, the combustor 3, a turbine 4, a rotating shaft 5, a casing 10, and a fan 7. In the gas turbine 1, air introduced into the casing 10 from an outside is compressed by the compressor 2, and the compressed air compressed by the compressor 2 is guided to the combustor 3. Then, energy of a high-temperature high-pressure combustion gas obtained by combusting fuel together with the compressed air in the combustor 3 is taken out as rotational power in the turbine 4.

The turbine 4 is coupled to the compressor 2 through the rotating shaft 5. The axis X of the rotating shaft 5 is the axis of the gas turbine 1. The fan 7 is connected to a front end portion of the rotating shaft 5. The rotational power generated by the turbine 4 drives the compressor 2 and the fan 7. There are various types of gas turbines. A turbo fan engine drives a fan by rotational power mainly generated by a turbine and is used as an aircraft engine. FIG. 1 shows the turbo fan engine that is a form of the gas turbine. However, the form of the gas turbine is not limited to this.

Figure 2:
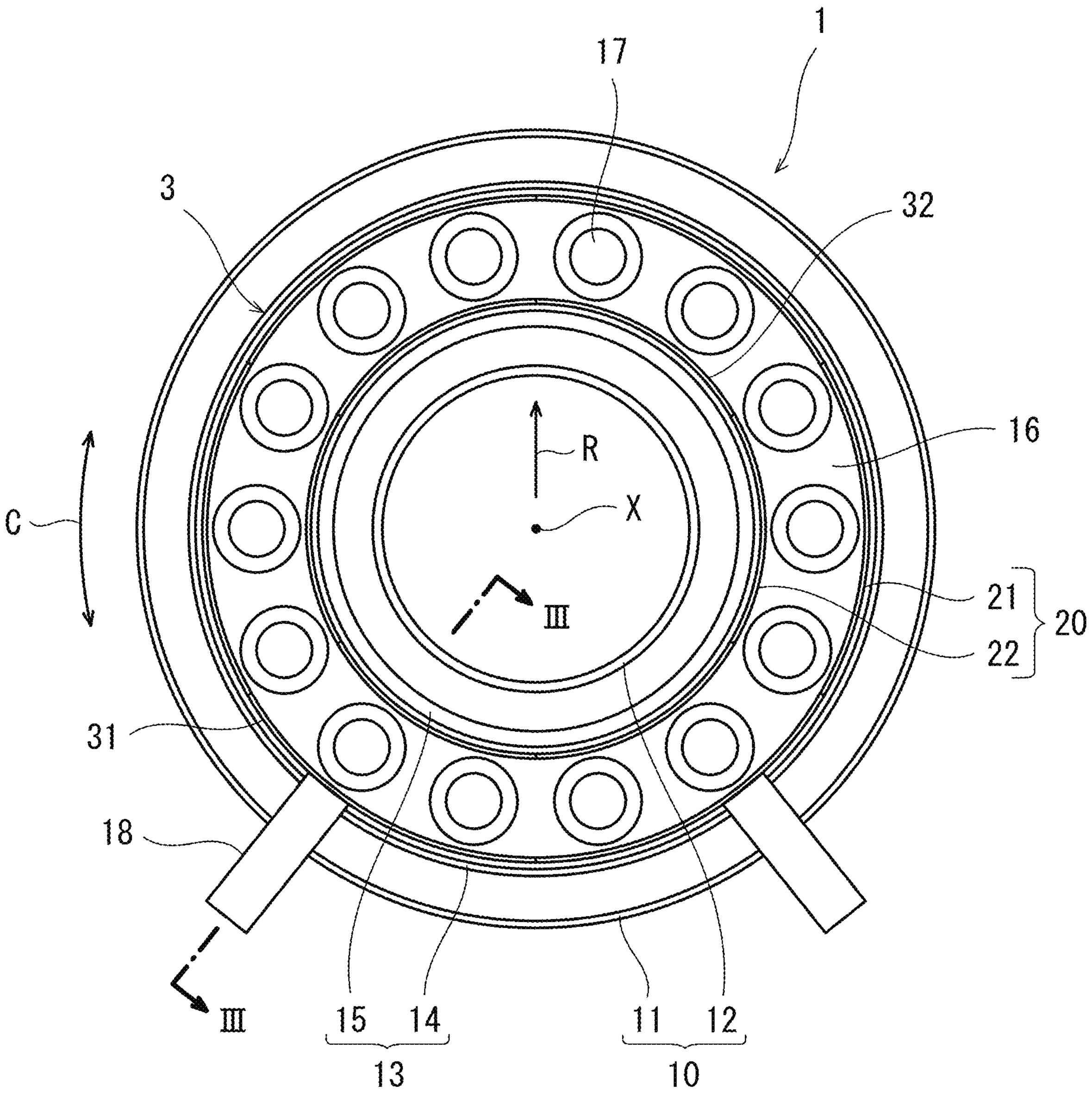
FIG. 2 is a sectional view when viewed from a downstream side in a flow direction of compressed air of a combustor of the gas turbine of FIG. 1.

FIG. 2 is a schematic diagram when viewed from the downstream side in the flow direction of the compressed air in the combustor 3 of the gas turbine 1 of FIG. 1. As shown in FIG. 2, the combustor 3 has a tubular shape. For example, the combustor 3 is an annular combustor having an annular shape surrounding the axis X of the gas turbine 1. The combustor 3 may be of a type other than the annular type. In the combustor 3, the casing 10 includes: a tubular outer casing 11; and a tubular inner casing 12 concentrically located inside the outer casing 11. The outer casing 11 and the inner casing 12 define an annular internal space. An inside of the combustor 3 denotes an inside of the outer casing 11 in the radial direction R and an outside of the inner casing 12 in the radial direction R.

A shell 13 as a combustion liner is located in the annular internal space of the casing 10 so as to be concentric with the casing 10. The shell 13 surrounds the combustion chamber 16. The shell 13 is made of, for example, metal. The shell 13 includes: a tubular outer shell 14; and a tubular inner shell 15 concentrically located inside the outer shell 14. An inside of the shell 13 denotes an inside of the outer shell 14 in the radial direction R and an outside of the inner shell 15 in the radial direction R.

The fuel injectors 17 that inject the fuel to the combustion chamber 16 are annularly lined up along the combustion chamber 16 at the upstream side of the combustion chamber 16. The fuel injectors 17 are lined up in the circumferential direction C on a virtual circle that is concentric with the shell 13. An ignition plug 18 is located at the shell 13. The ignition plug 18 generates a spark for igniting a fuel-air mixture in the combustion chamber 16 at the start of the gas turbine 1. A liner 20 is located in the annular internal space of the shell 13 so as to be concentric with the casing 10 and the shell 13.

The liner 20 is made of, for example, a ceramic matrix composite (CMC). The liner 20 includes: a tubular outer liner 21; and a tubular inner liner 22 concentrically located inside the outer liner 21. The outer liner 21 covers an inner peripheral surface of the outer shell 14. The inner liner 22 covers an outer peripheral surface of the inner shell 15.

The outer liner 21 may be an assembly of liner panels 31 which are adjacently lined up in the circumferential direction so as to form a tubular shape. Similarly, the inner liner 22 may be an assembly of liner panels 32 which are adjacently lined up in the circumferential direction so as to form a tubular shape. One or each of the outer liner 21 and the inner liner 22 may be a tubular body integrally molded in a tubular shape without being divided into the liner panels lined up in the circumferential direction. Moreover, each liner panel is not limited to a circular-arc plate and may be a flat plate. The liner including the liner panels does not have to have a cylindrical shape and may have a polygonal tubular shape.

Figure 3:
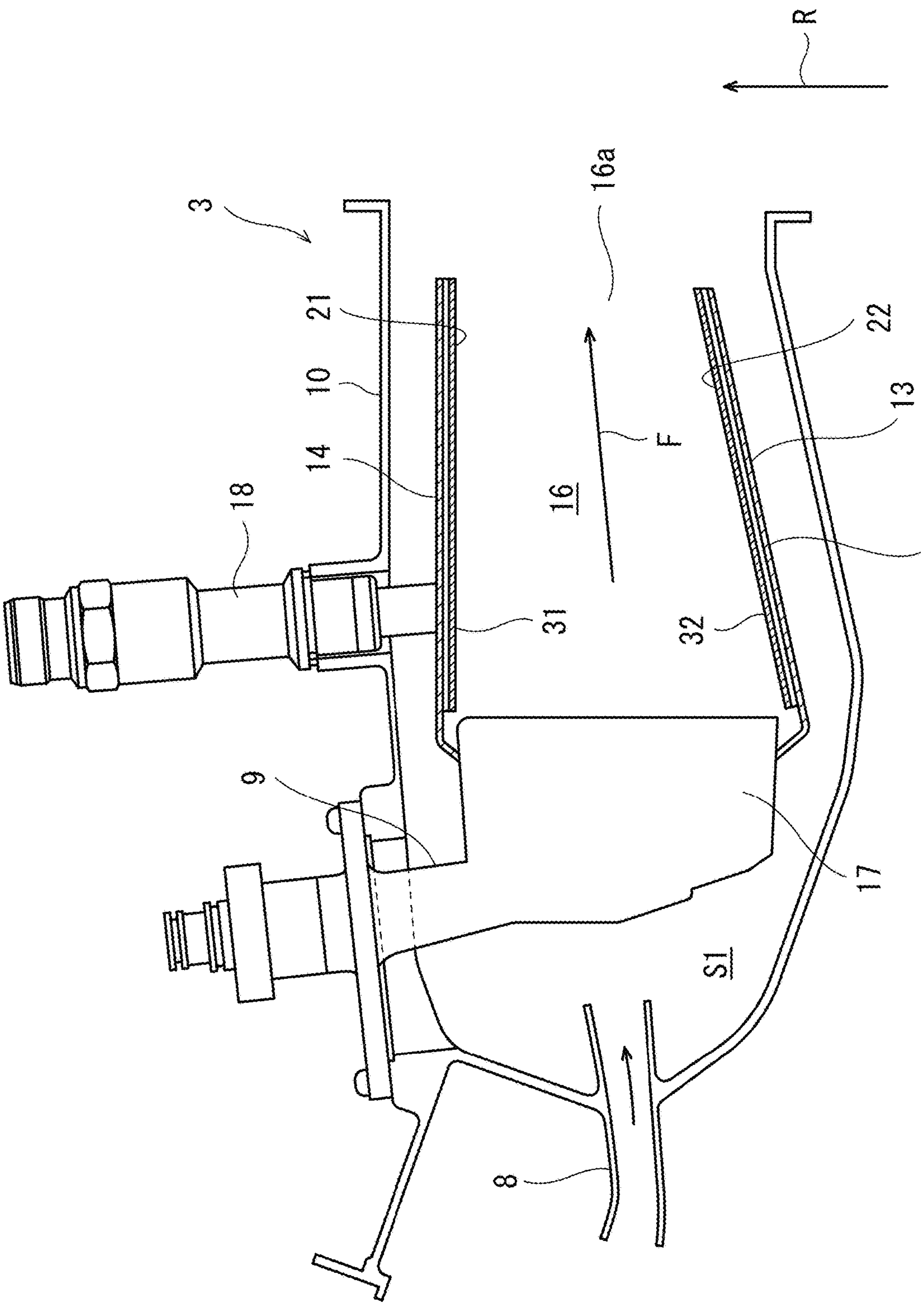
FIG. 3 is a sectional view taken along line III-III of the combustor of FIG. 2.

FIG. 3 is a sectional view taken along line III-III of the combustor 3 of FIG. 2. As shown in FIG. 3, a diffuser 8 is located at an upstream portion of the casing 10. The diffuser 8 takes the compressed air, generated by the compressor 2, into the casing 10. The fuel injectors 17 are supported by a stem 9 fixed to the casing 10. Part of the compressed air taken into a space S1 in the casing 10 is supplied to the fuel injectors 17 for combustion. The rest of the compressed air taken into the space S1 in the casing 10 cools an outer surface of the shell 13, and part of the rest of the compressed air is supplied as cooling air into the shell 13 through openings **14*b* (see FIG. 4) of the outer shell 14**.

The outer liner 21 is located so as to be spaced apart from the outer shell 14 toward the inside in the radial direction R. The inner liner 22 is located so as to be spaced apart from the inner shell 15 toward the outside in the radial direction R. The outer liner 21 and the inner liner 22 are attached to the shell 13 by fixtures 40 (see FIG. 4) so as to be spaced apart from the shell 13. The outer liner 21 and the inner liner 22 define the combustion chamber 16. A combustion gas in the combustion chamber 16 is discharged toward the turbine 4 (see FIG. 1) through the discharge port **16*a* defined by an end of the outer liner 21 and an end of the inner liner 22 which are located at the downstream side in the flow direction F of the compressed air in the combustion chamber 16**.

An attaching structure in which the outer liner 21 is attached to the outer shell 14 and an attaching structure in which the inner liner 22 is attached to the inner shell 15 are the same as each other. Therefore, the following will mainly describe the attaching structure in which the outer liner 21 is attached to the outer shell 14.

Figure 4:
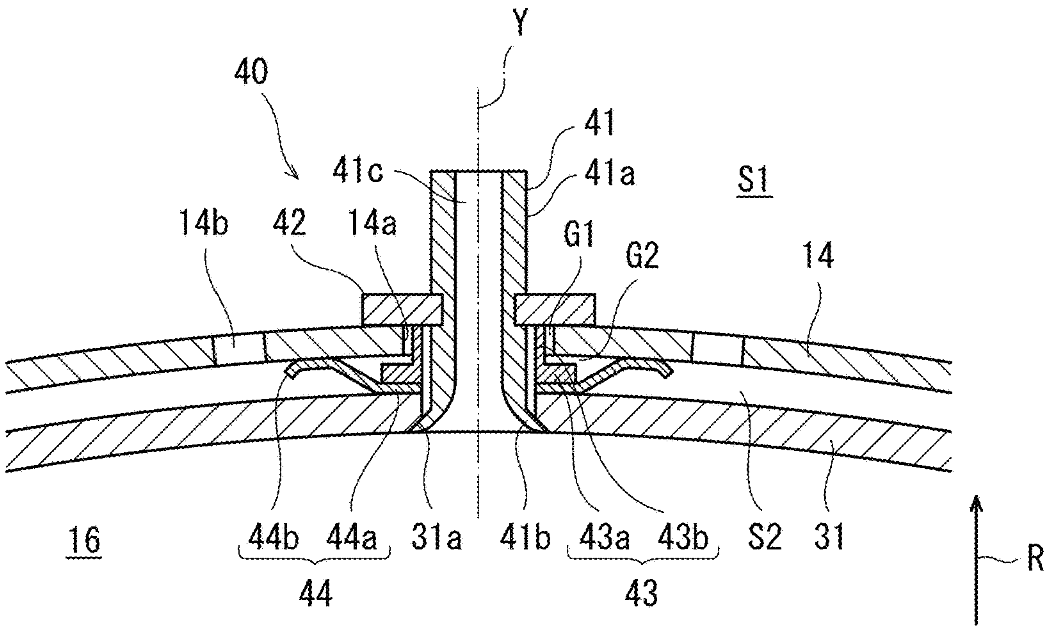
FIG. 4 is a partial sectional view of the combustor of FIG. 3.

FIG. 4 is a partial sectional view of the combustor 3 of FIG. 3. As shown in FIG. 4, the outer shell 14 includes through holes **14*a* for attachment and the openings 14*b* for cooling. Each liner panel 31 includes support holes 31*a* for attachment. The support holes 31*a* of the liner panel 31 are located so as to coincide with the through holes 14*a* of the outer shell 14 in the radial direction R. An inner peripheral surface of each support hole 31*a* has a shape corresponding to the fixture 40. For example, the inner peripheral surface of the support hole 31*a*** includes a tapered surface that increases in diameter toward the inside in the radial direction R.

The fixtures 40 attach the liner panel 31 to the outer shell 14. The fixtures 40 are made of, for example, metal, but may be made of a material other than the metal. The fixture 40 is an assembly including a support 41, a fixing structure 42, a spacer 43, and a biasing structure 44.

The support 41 is inserted into the support hole **31*a* of the liner panel 31 and the through hole 14*a* of the outer shell 14 from the inside in the radial direction R. The support 41 includes a shaft portion 41*a*, a head portion 41*b*, and an air passage 41*c* connected to the combustion chamber 16. The shaft portion 41*a* extends in the radial direction R and is inserted into the through hole 14*a* of the outer shell 14. A central axis Y of the shaft portion 41*a* extends in the radial direction R. A portion of an outer peripheral surface of the shaft portion 41*a* which is located outside the outer shell 14** in the radial direction R includes a screw or an engagement groove.

The head portion 41*b* is connected to an end portion of the shaft portion 41*a* which is located at the inside in the radial direction R. An outer diameter of the head portion 41*b* is larger than an outer diameter of the shaft portion 41*a*. An outer peripheral surface of the head portion 41*b* includes a tapered surface that increases in diameter from the outside to the inside in the radial direction R. The head portion 41*b* is located at the support hole 31*a* of the liner panel 31. The tapered surface of the outer peripheral surface of the head portion 41*b* is brought into contact with the tapered surface of the inner peripheral surface of the support hole 31*a* from the inside in the radial direction R. To be specific, the head portion 41*b* supports the liner panel 31 from the inside in the radial direction R. The outer peripheral surface of the head portion 41*b* and the inner peripheral surface of the support hole 31*a* may not include the tapered surfaces, and the head portion 41*b* of the support 41 may be brought into contact with a surface of the liner panel 31 which is located at the inside in the radial direction R.

The air passage 41*c* extends inside the support 41 along the central axis Y of the support 41 from the shaft portion 41*a* to the head portion 41*b*. The air passage 41*c* is open to the combustion chamber 16 and the space S1 which is located outside the outer shell 14 in the radial direction R. A portion of the air passage 41*c* which is located at the inside in the radial direction R has a truncated cone shape that expands toward the combustion chamber 16. The air passage 41*c* may include a swirl generator that makes the air flowing through the air passage 41*c* swirl. The swirl generator is, for example, an air inlet which is inclined relative to the central axis Y of the support 41 and through which the air is supplied to the air passage 41*c*. The support 41 may not include the air passage 41*c*.

The compressed air flowing into the space S1 from the compressor 2 (see FIG. 1) through the diffuser 8 (see FIG. 3) flows through the openings 14*b* of the outer shell 14 into a cooling space S2 between the outer shell 14 and the liner panel 31 as cooling air. A seal structure (not shown) is located between the outer shell 14 and the liner panel 31. The seal structure prevents the cooling air from leaking from the cooling space S2. Moreover, when the support 41 includes the air passage 41*c*, the compressed air in the space S1 flows through the air passage 41*c* and is discharged as the cooling air to the combustion chamber 16 along an inside surface of the liner panel 31.

The fixing structure 42 is attached to the shaft portion 41*a* of the support 41 at the outside of the outer shell 14 in the radial direction R. When viewed in a direction in which the central axis Y extends, an outer shape of the fixing structure 42 is larger than the through hole 14*a* of the outer shell 14. The fixing structure 42 is attached to the shaft portion 41*a* of the support 41 so as to prevent the support 41 from coming out from the outer shell 14 to the inside in the radial direction R. The fixing structure 42 is attached so as not to be displaceable relative to the support 41 in the direction in which the central axis Y extends. For example, the fixing structure 42 is a C-shaped clip that is engaged with the engagement groove of the outer peripheral surface of the shaft portion 41*a*. The fixing structure 42 may be a nut that is threadedly engaged with the screw of the outer peripheral surface of the shaft portion 41*a*. The fixing structure 42 and the shaft portion 41*a* may be attached to each other by any method. Moreover, although the fixing structure 42 is directly opposed to an outer surface of the outer shell 14, another structure may be interposed between the fixing structure 42 and the outer shell 14.

The spacer 43 is interposed between the outer shell 14 and the liner panel 31. The spacer 43 has a ring shape around the central axis Y. However, the shape of the spacer 43 is not limited to this. The spacer 43 is externally fitted to the shaft portion 41*a* of the support 41 with a play. The spacer 43 includes a main body portion 43*a* and a projecting portion 43*b*. The main body portion 43*a* is located between the outer shell 14 and the liner panel 31. The main body portion 43*a* has, for example, a ring plate shape. When viewed in the direction in which the central axis Y extends, an outer shape of the main body portion 43*a* is larger than the through hole 14*a* of the outer shell 14.

The projecting portion 43*b* projects from the main body portion 43*a* to the outside in the radial direction R and is inserted into the through hole 14*a* of the outer shell 14. The projecting portion 43*b* has a tubular shape. There is a gap G1 between the inner peripheral surface of the through hole 14*a* of the outer shell 14 and the projecting portion 43*b*. To be specific, the spacer 43 is displaceable relative to the outer shell 14 in a direction orthogonal to the central axis Y.

The biasing structure 44 biases the liner panel 31 toward the inside in the radial direction R such that the liner panel 31 separates from the outer shell 14 in the radial direction R. The biasing structure 44 is, for example, an annular disc spring. The biasing structure 44 has a ring shape around the central axis Y. The biasing structure 44 is not limited to this, and may be, for example, a coil spring wound around the central axis Y. The biasing structure 44 is externally fitted to the shaft portion 41*a* of the support 41 with a play.

The biasing structure 44 includes a base portion 44*a* and an elastic portion 44*b*. The base portion 44*a* is sandwiched between the spacer 43 and the liner panel 31 in the radial direction R. The elastic portion 44*b* is located outside the spacer 43 in the direction orthogonal to the central axis Y of the support 41. The elastic portion 44*b* projects from the base portion 44*a* toward the outer shell 14. The elastic portion 44*b* biases the outer shell 14 toward the outside in the radial direction R. The base portion 44*a* biases the liner panel 31 toward the inside in the radial direction R by reaction force applied to the elastic portion 44*b* from the outer shell 14.

The liner panel 31 is displaced by the biasing structure 44 toward the inside in the radial direction R. The support 41, the fixing structure 42, and the spacer 43 are displaced toward the inside in the radial direction R, and this forms a gap G2 between the main body portion 43*a* of the spacer 43 and the outer shell 14 in the radial direction R. The fixing structure 42 directly presses the projecting portion 43*b* of the spacer 43 toward the inside in the radial direction R but may indirectly press the projecting portion 43*b*.

According to the above-described configuration, even when a thermal expansion difference is generated between the outer shell 14 and the liner panel 31 by a temperature difference between the shell and the liner, a difference between thermal expansion coefficients of materials, a temperature difference between front and rear surfaces of the liner, and the like, the liner panel 31 can be displaced against the biasing force of the biasing structure 44 so as to reduce the the gap G2 between the spacer 43 and the outer shell 14, and this can reduce the stress of the liner panel 31. Moreover, the liner panel 31 can be displaced in the gap G1 between the outer shell 14 and the spacer 43, and this can reduce the stress of the liner panel 31. Therefore, the durability of the liner panel 31 in the combustor 3 of the gas turbine 1 can be improved.

Since the biasing structure 44 includes the base portion 44*a* and the elastic portion 44*b*, the biasing structure 44 that forms the gap G2 between the spacer 43 and the outer shell 14 can be easily attached by a small number of parts.

Figure 5:
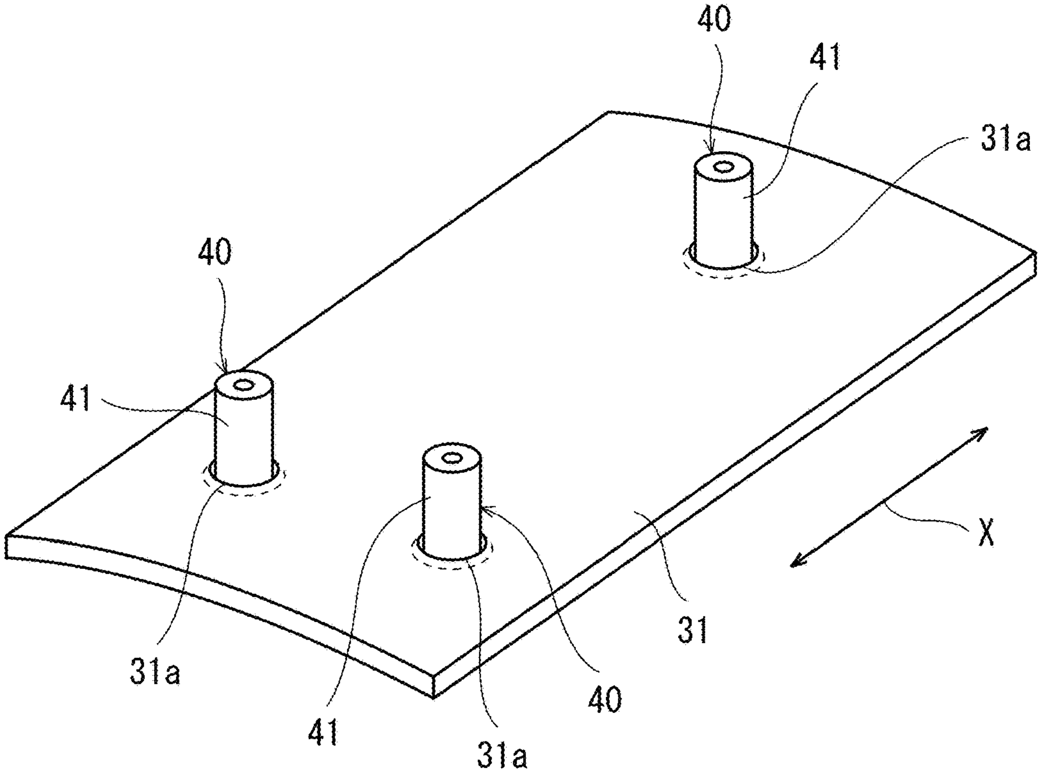
FIG. 5 is a perspective view showing a liner panel and supports in the combustor of FIG. 2.

FIG. 5 is a perspective view showing the liner panel 31 and the supports 41 in the combustor 3 of FIG. 2. FIG. 5 shows the supports 41 of the fixtures 40, but the fixing structures 42, the spacers 43, and the biasing structures 44 of the fixtures 40 and the outer shell 14 are not shown. As shown in FIG. 5, the liner panel 31 is supported by three fixtures 40 as three-point support. The liner panel 31 extends in the axial direction X of the combustor 3. Two fixtures 40 are located at one of longitudinal-direction portions of the liner panel 31, and one fixture 40 is located at the other longitudinal-direction portion of the liner panel 31. The three fixtures 40 are located at respective positions that are vertices of an isosceles triangle. The positions of the three fixtures 40 are not limited to these, and may be any positions.

An in-plane direction of the liner panel 31 is determined by the three-point support using the three fixtures 40. Therefore, even when the thermal expansion difference is generated between the outer shell 14 and the liner panel 31, the change in the posture of the liner panel 31 can be suppressed. Moreover, since support points of the liner panel 31 are three points, binding power can be prevented from acting in an out-of-plane direction of the liner panel 31. Therefore, the durability of the liner panel 31 in the combustor 3 of the gas turbine 1 can be improved. Moreover, since the change in the posture of the liner panel 31 is suppressed, seal performance of the seal structure located between the liner panel 31 and the outer shell 14 can be easily maintained as designed.

Embodiment 2

Figure 6:
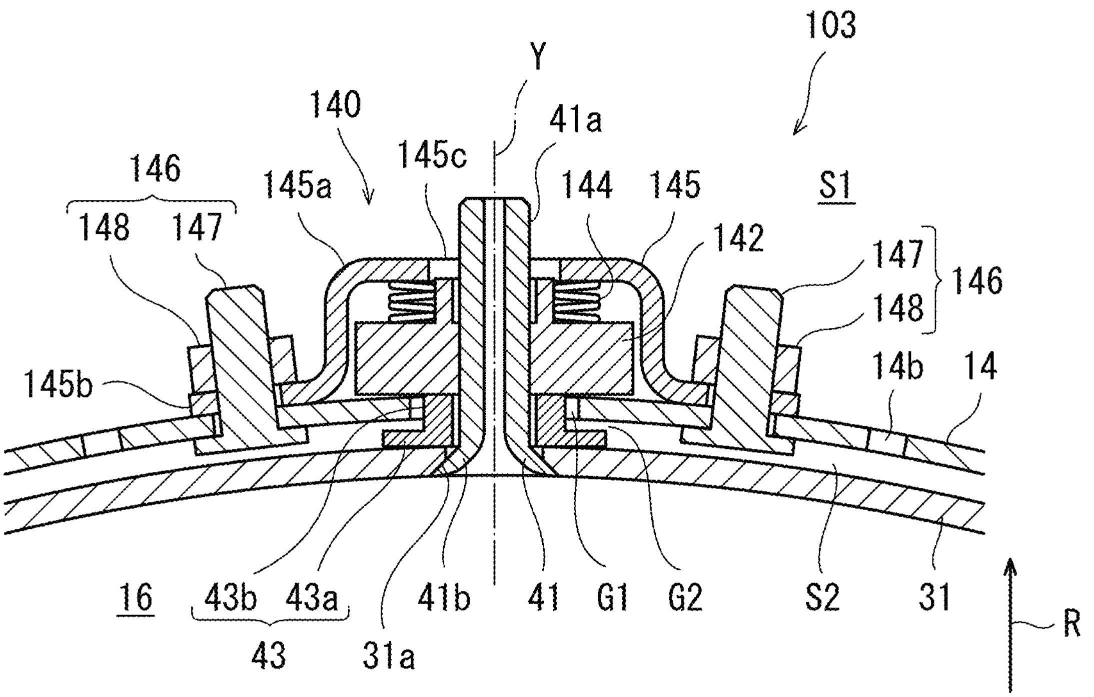
FIG. 6 is a partial sectional view of the combustor of Embodiment 2.

FIG. 6 is a partial sectional view of a combustor 103 of Embodiment 2. The same reference signs are used for the same components as Embodiment 1, and explanations thereof are omitted. As shown in FIG. 6, in the combustor 103 of Embodiment 2, the liner panel 31 is attached to the outer shell 14 by fixtures 140. As with the above, in Embodiment 2, one liner panel 31 can be attached to the outer shell 14 by three fixtures 140 as the three-point support.

Each fixture 140 includes the support 41, a fixing structure 142, the spacer 43, a biasing structure 144, a pressing structure 145, and fasteners 146. The pressing structure 145 covers the fixing structure 142 from the outside in the radial direction R and is fixed to the outer shell 14 by the fasteners 146. The pressing structure 145 includes a recess portion **145*a* and a flange portion 145*b*. The recess portion 145*a* is recessed toward the outside in the radial direction R and is open toward the inside in the radial direction R. The flange portion 145*b* projects in the direction orthogonal to the central axis Y of the support 41 from an end portion of the recess portion 145*a* which is located at the inside in the radial direction R. The flange portion 145*b* of the pressing structure 145 is fixed to the outer shell 14 by the fasteners 146. Each fastener 146 includes, for example, a bolt 147 and a nut 148. The fastener 146 may be something else (rivet, for example) as long as it can fix the pressing structure 145 to the outer shell 14**.

The fixing structure 142 and the biasing structure 144 are accommodated in a space between the recess portion **145*a* of the pressing structure 145 and the outer shell 14. The fixing structure 142 is attached to the shaft portion 41*a* of the support 41 at the outside of the outer shell 14 in the radial direction R. When viewed from the direction in which the central axis Y extends, an outer shape of the fixing structure 142 is larger than the through hole 14*a* of the outer shell 14. For example, the fixing structure 142 is a nut that is threadedly engaged with the screw of the outer peripheral surface of the shaft portion 41*a* of the support 41. The biasing structure 144 is sandwiched between a bottom portion of the recess portion 145*a* of the pressing structure 145 and the fixing structure 142. The fixing structure 142 is a lower seat that supports the biasing structure 144 from the inside in the radial direction R, and the pressing structure 145 is an upper seat that supports the biasing structure 144 from the outside in the radial direction R. The biasing structure 144 presses the fixing structure 142 toward the inside in the radial direction R to bias the support 41 and the fixing structure 142 toward the inside in the radial direction R. For example, the biasing structure 144 includes a coil spring wound around the central axis Y. The biasing structure 144 may be an elastic body (disc spring, for example) other than the coil spring. The recess portion 145*a* of the pressing structure 145 includes an insertion hole 145*c*. The shaft portion 41*a* of the support 41 is inserted into the insertion hole 145*c* of the recess portion 145*a* in the radial direction R. The shaft portion 41*a* does not have to be inserted into the insertion hole 145*c***.

The support 41, the fixing structure 142, and the spacer 43 are displaced toward the inside in the radial direction R by the biasing structure 144. The liner panel 31 is pressed toward the inside in the radial direction R, and this forms the gap G2 between the main body portion **43*a* of the spacer 43 and the outer shell 14** in the radial direction R.

According to the above-described configuration, even when the thermal expansion difference is generated between the outer shell 14 and the liner panel 31 by a temperature difference between the shell and the liner, a difference between thermal expansion coefficients of materials, a temperature difference between front and rear surfaces of the liner, and the like, the liner panel 31 can be displaced against the biasing force of the biasing structure 144 so as to reduce the the gap G2 between the spacer 43 and the outer shell 14, and this can reduce the stress of the liner panel 31. Moreover, the liner panel 31 can be displaced in the gap G1 between the outer shell 14 and the spacer 43, and this can reduce the stress of the liner panel 31. Therefore, the durability of the liner panel 31 in the combustor 103 can be improved.

Moreover, since the biasing structure 144 is located at the outside of the outer shell 14 in the radial direction R, the biasing structure 144 can be located away from the heat of the combustion chamber 16, and this can reduce a heat load of the biasing structure 144. Moreover, since the fixing structure 142 presses the projecting portion **43*b* of the spacer 43 toward the inside in the radial direction R, the gap G2 between the spacer 43 and the outer shell 14 can be maintained while preventing vibrations of the spacer 43**. Since the other components are the same as those in Embodiment 1, explanations thereof are omitted.

Embodiment 3

Figure 7:
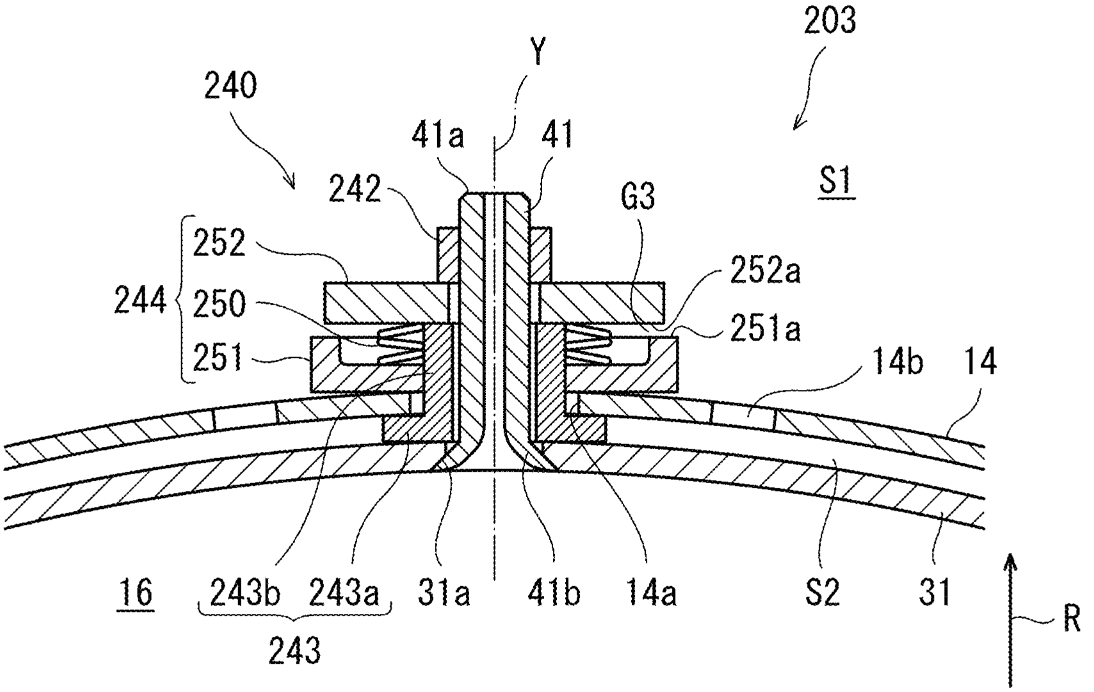
FIG. 7 is a partial sectional view of the combustor of Embodiment 3.

FIG. 7 is a partial sectional view of a combustor 203 of Embodiment 3. The same reference signs are used for the same components as Embodiment 1, and explanations thereof are omitted. As shown in FIG. 7, in the combustor 203 of Embodiment 3, the liner panel 31 is attached to the outer shell 14 by fixtures 240. As with the above, in Embodiment 3, one liner panel 31 can be attached to the outer shell 14 by three fixtures 240 as the three-point support. Each fixture 240 includes the support 41, a fixing structure 242, a spacer 243, and a biasing structure 244. The fixing structure 242 is attached to the shaft portion 41*a* of the support 41 at the outside of the outer shell 14 in the radial direction R. For example, the fixing structure 242 is a nut that is threadedly engaged with the screw of the outer peripheral surface of the shaft portion 41*a*, but may be another structure, such as a clip. The biasing structure 244 is located between the fixing structure 242 and the outer shell 14 in the radial direction R. The biasing structure 244 is an assembly including an elastic body 250, a lower seat 251, and an upper seat 252. The elastic body 250 is, for example, a spring. Specifically, the elastic body 250 is a coil spring wound around the central axis Y, but may be something else (disc spring, for example).

The lower seat 251 is located at the inside of the elastic body 250 in the radial direction R. The upper seat 252 is located at the outside of the elastic body 250 in the radial direction R. The lower seat 251 and the upper seat 252 include respective opposing surfaces 251*a* and 252*a* which bypass the elastic body 250 and are opposed to each other in the radial direction R. Since the upper seat 252 is pressed by the biasing structure 244 toward the outside in the radial direction R, a gap G3 is formed between the opposing surface 251*a* of the lower seat 251 and the opposing surface 252*a* of the upper seat 252 in the radial direction R.

The spacer 243 has a ring shape around the central axis Y. The spacer 243 includes a main body portion 243*a* and a projecting portion 243*b*. The main body portion 243*a* is sandwiched between the outer shell 14 and the liner panel 31. When viewed from the direction in which the central axis Y extends, an outer shape of the main body portion 243*a* is larger than the through hole 14*a* of the outer shell 14. The main body portion 243*a* has, for example, a ring plate shape. The projecting portion 243*b* projects from the main body portion 243*a* toward the outside in the radial direction R, passes through the through hole 14*a* of the outer shell 14, and contacts the upper seat 252 from the inside in the radial direction R. The projecting portion 243*b* has, for example, a tubular shape. FIG. 7 shows that the operation of the gas turbine 1 is in a stop state.

Figure 8:
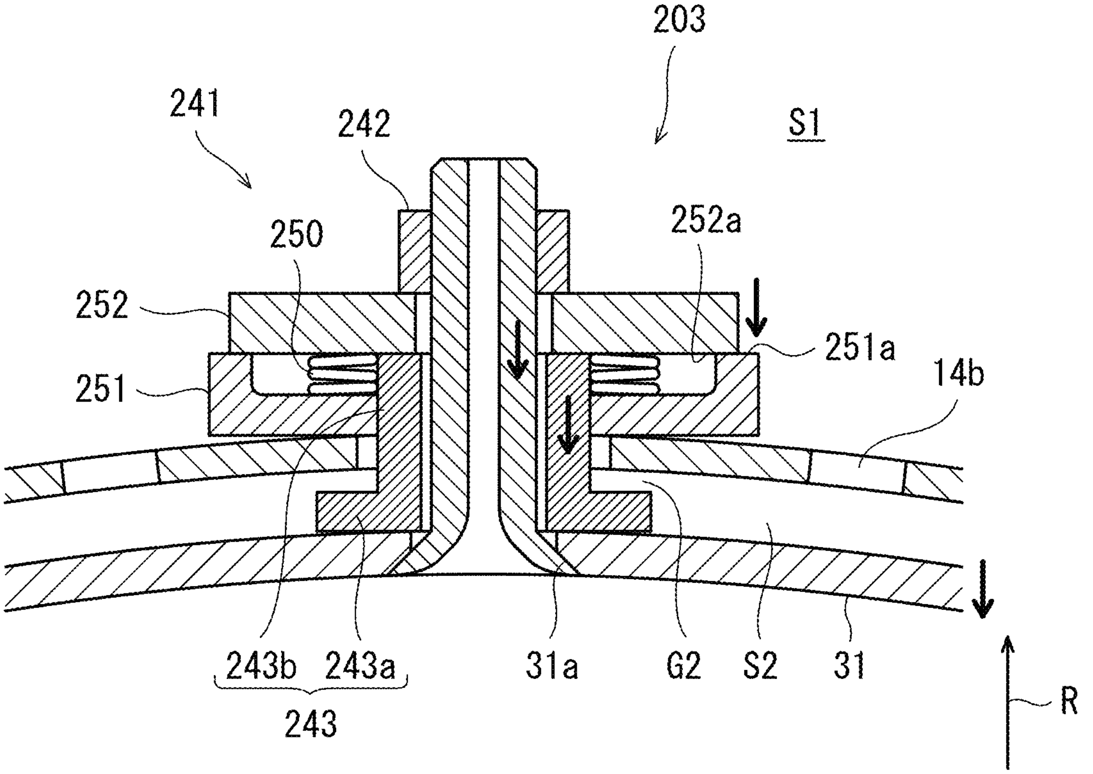
FIG. 8 is an enlarged partial sectional view of the combustor of FIG. 7 while the gas turbine is operating.

FIG. 8 is a partial sectional view of the combustor 203 of FIG. 7 while the gas turbine is operating. As shown in FIG. 8, while the gas turbine is operating, the compressed air flowing into the space S1 from the compressor 2 (see FIG. 1) flows into the cooling space S2 through the openings 14*b* of the outer shell 14. When this increases the pressure in the cooling space S2, the compressed air in the cooling space S2 displaces the liner panel 31 toward the inside in the radial direction R against the biasing force of the elastic body 250.

As the liner panel 31 is displaced toward the inside in the radial direction R, the support 41, the fixing structure 242, and the spacer 243 are displaced toward the inside in the radial direction R. When the opposing surface 252*a* of the upper seat 252 is brought into contact with the opposing surface 251*a* of the lower seat 251, the displacement of the liner panel 31 toward the inside in the radial direction R stops. This forms the gap G2 between the spacer 243 and the outer shell 14 in the radial direction R.

According to the above-described configuration, the gas turbine starts, and the compressed air flowing into the cooling space S2 from the compressor 2 displaces the liner panel 31 toward the inside in the radial direction R against the biasing structure 244. This forms the gap G2 between the spacer 243 and the outer shell 14 in the radial direction R. Even when the thermal expansion difference is generated between the outer shell 14 and the liner panel 31 by a temperature difference between the shell and the liner, a difference between thermal expansion coefficients of materials, a temperature difference between front and rear surfaces of the liner, and the like in a state where there is the gap G2, the liner panel 31 can be displaced so as to reduce the distance between the spacer 243 and the outer shell 14, and this can reduce the stress of the liner panel 31. Moreover, the liner panel 31 can be displaced in the gap G1 between the outer shell 14 and the spacer 243, and this can reduce the stress of the liner panel 31. Therefore, the durability of the liner panel 31 in the combustor 203 can be improved.

Moreover, since the biasing structure 244 is located at the outside of the outer shell 14 in the radial direction R, the biasing structure 244 can be located away from the heat of the combustion chamber 16, and this can reduce the heat load of the biasing structure 244. Furthermore, since the biasing structure 244 is the above-described assembly, the fixing structure 242 can be biased toward the outside in the radial direction R by a simple configuration. Moreover, when the compressed air flowing into the cooling space S2 from the compressor 2 displaces the liner panel 31 toward the inside in the radial direction R so as to reduce the distance between the upper seat 252 and the lower seat 251, the upper seat 252 and the lower seat 251 are brought into contact with each other, and this stops the displacement. Therefore, the elastic body 250 can be protected.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The following aspects disclose preferred embodiments.

First Aspect

A combustor of a gas turbine, the combustor including:

a shell surrounding a combustion chamber;

a liner located inside the shell and facing the combustion chamber; and a fixture by which the liner is attached to the shell, the fixture including

- a support including a shaft portion and a head portion, the shaft portion penetrating the shell, the head portion being connected to the shaft portion and supporting the liner from an inside of the shell in a radial direction,
- a fixing structure attached to the shaft portion of the support at an outside of the shell in the radial direction,
- a spacer interposed between the shell and the liner, and
- a biasing structure that biases the liner toward the inside in the radial direction to separate the liner from the shell in the radial direction and form a gap between the spacer and the shell in the radial direction.

According to this configuration, even when the thermal expansion difference is generated between the shell and the liner panel by the temperature difference between the shell and the liner, the difference between thermal expansion coefficients of materials, the temperature difference between front and rear surfaces of the liner, and the like, the liner panel can be displaced against the biasing force of the biasing structure so as to reduce the gap between the spacer and the shell, and this can reduce the stress of the liner panel. Moreover, the liner panel can be displaced by the gap between the shell and the spacer, and this can reduce the stress of the liner panel. Therefore, the durability of the liner panel in the combustor of the gas turbine can be improved.

Second Aspect

The combustor according to the first aspect, wherein the biasing structure biases the support, the fixing structure, and the spacer toward the inside in the radial direction to form the gap between the spacer and the shell in the radial direction.

According to this configuration, there is the gap between the spacer and the shell such that when the thermal expansion difference is generated between the shell and the liner panel, the liner panel can contract in the radial direction. Therefore, the stress of the liner panel can be reduced. Moreover, the liner panel can be displaced in the gap between the shell and the spacer, and this can reduce the stress of the liner panel. Therefore, the durability of the liner panel in the combustor of the gas turbine can be improved.

Third Aspect

The combustor according to the first or second aspect, wherein the spacer includes:

a main body portion located between the shell and the liner; and a projecting portion projecting from the main body portion toward the outside in the radial direction and penetrating the shell.

According to this configuration, the vibrations of the spacer can be suppressed.

Fourth Aspect

The combustor according to any one of the first to third aspects, wherein:

the fixture further includes a pressing structure that covers the fixing structure from the outside in the radial direction and is fixed to the shell; and the biasing structure is located between the pressing structure and the fixing structure.

According to this configuration, since the biasing structure is located outside the shell in the radial direction, the heat load applied from the combustion chamber to the biasing structure can be suppressed.

Fifth Aspect

The combustor according to any one of the first to third aspects, wherein the biasing structure includes:

a base portion located between the spacer and the liner in the radial direction; and an elastic portion that is located outside the spacer in a direction orthogonal to the radial direction and biases the shell toward the outside in the radial direction.

According to this configuration, the biasing structure that forms the gap between the spacer and the shell can be easily attached by a small number of parts.

Sixth Aspect

A combustor of a gas turbine, the combustor including:

a shell surrounding a combustion chamber;

a liner located inside the shell and facing the combustion chamber;

a cooling space into which compressed air flows and which is located between the shell and the liner; and a fixture by which the liner is attached to the shell, the fixture including a support including a shaft portion and a head portion, the shaft portion penetrating the shell, the head portion being connected to the shaft portion and supporting the liner from an inside of the shell in a radial direction, a spacer interposed between the shell and the liner, a fixing structure attached to the shaft portion of the support at an outside of the shell in the radial direction, and a biasing structure that is located outside the shell in the radial direction and located inside the fixing structure in the radial direction and biases the fixing structure toward the outside in the radial direction such that the liner approaches the shell in the radial direction against the compressed air flowing into the cooling space.

According to this configuration, the gas turbine starts, and the compressed air flowing from the compressor into the cooling space between the shell and the liner displaces the liner panel toward the inside in the radial direction against the biasing structure. This forms the gap between the spacer and the outer shell in the radial direction. Even when the thermal expansion difference is generated between the shell and the liner panel by the temperature difference between the shell and the liner, the difference between thermal expansion coefficients of materials, the temperature difference between front and rear surfaces of the liner, and the like in a state where there is the gap, the liner panel can be displaced so as to reduce the distance between the spacer and the shell, and this can reduce the stress of the liner panel. Moreover, the liner panel can be displaced by the gap between the shell and the spacer, and this can reduce the stress of the liner panel. Therefore, the durability of the liner panel in the combustor can be improved.

Seventh Aspect

The combustor according to the sixth aspect, wherein the biasing structure includes:

an elastic body;

an upper seat located outside the elastic body in the radial direction; and a lower seat located inside the elastic body in the radial direction.

According to this configuration, the fixing structure can be biased toward the outside in the radial direction by a simple configuration.

Eighth Aspect

The combustor according to the seventh aspect, wherein:

the upper seat and the lower seat include respective opposing surfaces which bypass the elastic body and are opposed to each other in the radial direction; and there is a gap between the opposing surface of the upper seat and the opposing surface of the lower seat.

According to this configuration, when the compressed air flowing from the compressor into the cooling space between the shell and the liner displaces the liner toward the inside in the radial direction so as to reduce the distance between the upper seat and the lower seat, the opposing surface of the upper seat and the opposing surface of the lower seat are brought into contact with each other, and this can protect the spring.

Ninth Aspect

A combustor of a gas turbine, the combustor including:

a shell surrounding a combustion chamber;

liner panels located inside the shell and facing the combustion chamber; and fixtures which attach the liner panels to the shell, wherein:

the liner panels are located in a circumferential direction of the shell; and three of the fixtures support one of the liner panels by three-point support.

According to this configuration, the in-plane direction of the liner is determined by the three-point support. Therefore, even when the thermal expansion difference is generated between the shell and the liner, the change in the posture of the liner can be suppressed. Moreover, since the support points of the liner are three points, the binding power can be prevented from acting in the out-of-plane direction of the liner. Therefore, the durability of the liner in the combustor of the gas turbine can be improved.

The invention claimed is:

1. A combustor of a gas turbine, the combustor comprising:

a shell surrounding a combustion chamber;

a liner located inside the shell and facing the combustion chamber;

a cooling space into which compressed air flows and which is located between the shell and the liner; and a fixture by which the liner is attached to the shell, the fixture including a support including a shaft portion and a head portion, the shaft portion penetrating the shell, the head portion being connected to the shaft portion and supporting the liner from an inside of the shell in a radial direction, a spacer including a main body portion and a projecting portion, the main body portion being located between the shell and the liner, the projecting portion projecting from the main body portion toward an outside in the radial direction and penetrating the shell, a fixing structure attached to the shaft portion of the support at an outside of the shell in the radial direction, and a biasing structure that is located outside the shell in the radial direction and located inside the fixing structure in the radial direction, wherein:

the biasing structure includes an elastic body, an upper seat located outside the elastic body in the radial direction, and a lower seat located inside the elastic body in the radial direction;

the upper seat and the lower seat include respective opposing surfaces which bypass the elastic body and are opposed to each other in the radial direction;

the projecting portion of the spacer contacts the upper seat;

the biasing structure biases the fixing structure toward the outside in the radial direction such that the liner approaches the shell in the radial direction against the compressed air flowing into the cooling space; and when a pressure in the cooling space exceeds a predetermined pressure in a state where there is a gap between the opposing surface of the upper seat and the opposing surface of the lower seat, the liner moves toward an inside in the radial direction, the opposing surface of the upper seat and the opposing surface of the lower seat contact each other, and a gap is formed between the main body portion of the spacer and the shell.

* * * * *